United States Patent
Bek et al.

(10) Patent No.: US 9,737,969 B2
(45) Date of Patent: Aug. 22, 2017

(54) COMPONENT FOR ESTABLISHING A FORM-LOCKING RIVETED CONNECTION OF A TOOL

(71) Applicant: C. & E. Fein GmbH, Schwaebisch Gmuend-Bargau (DE)

(72) Inventors: Fabian Bek, Boebingen (DE); Markus Knecht, Rudersberg (DE); Thomas Weber, Winterbach (DE); Rainer Mann, Aalen-Dewangen (DE)

(73) Assignee: C. & E. Fein GmbH, Schwaebisch Gmuend (DE)

( * ) Notice: Subject to any disclaimer, the term of this patent is extended or adjusted under 35 U.S.C. 154(b) by 0 days.

(21) Appl. No.: 15/124,322

(22) PCT Filed: Jan. 27, 2015

(86) PCT No.: PCT/EP2015/051577
§ 371 (c)(1),
(2) Date: Sep. 7, 2016

(87) PCT Pub. No.: WO2015/132019
PCT Pub. Date: Sep. 11, 2015

(65) Prior Publication Data
US 2017/0028525 A1 Feb. 2, 2017

(30) Foreign Application Priority Data
Mar. 7, 2014 (DE) .......................... 10 2014 103 048

(51) Int. Cl.
*B23D 23/04* (2006.01)
*B24B 23/04* (2006.01)
(Continued)

(52) U.S. Cl.
CPC ............... *B24B 23/04* (2013.01); *B21J 15/02* (2013.01); *B21K 25/00* (2013.01); *B23D 61/006* (2013.01); *B23D 61/026* (2013.01); *F16B 5/045* (2013.01)

(58) Field of Classification Search
CPC .... B24B 23/04; B23D 61/006; B23D 61/026; B21J 15/02; B21K 25/00
(Continued)

(56) References Cited

U.S. PATENT DOCUMENTS 1,681,648 A * 8/1928 Root ...................... B24B 23/04
15/97.1
2,031,246 A * 2/1936 Biggert, Jr. .......... B23D 35/004
403/373

(Continued)

FOREIGN PATENT DOCUMENTS

| CH | 101462 A | 10/1923 |
|---|---|---|
| DE | 3216357 A1 | 11/1983 |

(Continued)

*Primary Examiner* — George Nguyen
(74) *Attorney, Agent, or Firm* — Slater Matsil, LLP

(57) ABSTRACT

An electric power tool is disclosed. In an embodiment, the electric power tool includes a tool, a tool holder part and a main body with a plurality of rivets integrated with the main body. The rivets include rivet shafts of a cross section for producing a positive-locking rivet joint of the tool with the tool holder part, wherein the tool and the tool holder part have circular openings which are aligned with each other, and wherein the rivet shafts are positioned aligned with the openings on the main body and protrude through the aligned openings.

9 Claims, 3 Drawing Sheets

(51) Int. Cl.
*B21K 25/00* (2006.01)
*B21J 15/02* (2006.01)
*B23D 61/02* (2006.01)
*F16B 5/04* (2006.01)
*B23D 61/00* (2006.01)

(58) Field of Classification Search
USPC ...... 451/344–359; 30/388–391; 83/663, 666, 83/698.41
See application file for complete search history.

(56) References Cited

U.S. PATENT DOCUMENTS

| | | | | |
|---|---|---|---|---|
| 3,943,934 | A * | 3/1976 | Bent | B27B 5/32 30/339 |
| 4,120,224 | A * | 10/1978 | Van Steenberg | B27B 5/32 83/666 |
| 8,151,679 | B2 * | 4/2012 | Bohne | B24B 23/04 83/698.11 |
| 8,608,579 | B2 | 12/2013 | Steinberger et al. | |
| 8,616,562 | B2 * | 12/2013 | Maras | B25F 3/00 279/143 |
| 2010/0180454 | A1 * | 7/2010 | Cheng | B23D 45/10 30/388 |
| 2012/0144676 | A1 * | 6/2012 | Davidian | B25F 3/00 30/142 |
| 2013/0047812 | A1 * | 2/2013 | McGehee | B27B 5/32 83/698.41 |
| 2014/0260877 | A1 * | 9/2014 | Hall | B23D 65/02 83/835 |

FOREIGN PATENT DOCUMENTS

| | | |
|---|---|---|
| DE | 202007003364 U1 | 7/2008 |
| DE | 202011052282 U1 | 3/2012 |
| DE | 102012200802 A1 | 8/2012 |
| EP | 1493937 A1 | 1/2005 |
| JP | 2003280475 A | 10/2003 |

* cited by examiner

COMPONENT FOR ESTABLISHING A FORM-LOCKING RIVETED CONNECTION OF A TOOL

CROSS-REFERENCE TO RELATED APPLICATIONS

This patent application is a national phase filing under section 371 of PCT/EP2015/051577, filed Jan. 27, 2015, which claims the priority of German patent application 10 2014 103 048.6, filed Mar. 7, 2014, each of which is incorporated herein by reference in its entirety.

TECHNICAL FIELD

The invention relates to a component for producing a positive-locking rivet joint of a tool with a tool holder part as well as a method for producing a positive-locking rivet joint of a tool with a tool holder part by means of the component.

BACKGROUND

Rivets are, as known from the prior art, plastically deformable, cylindrical fasteners with which a positive-locking joint of two components can be produced. Typically, a rivet has a rivet shaft with an applied factory head. Typical rivet materials are, for example, steel, copper, aluminum alloys, plastic, and titanium.

In the components to be joined a hole is usually formed, which has a slightly larger diameter than the rivet shaft. The rivet is inserted through the pre-drilled or pre-punched hole, in such a way that the factory head rests on one side of the workpieces to be connected and such that the rivet shaft extends beyond the hole. The rivet is deformed by pressure in width, so that a shop head forms and the workpieces are firmly interconnected. The pressure may be applied suddenly by impact or continuously, eg. by a hydraulic press.

Since this process is very elaborate, especially if a plurality of rivets needed, the classical rivet joint today is often replaced in technical applications by a welded joint. Riveting is usually only done where welding is not suitable, such as in lightweight or non-weldable materials.

From DE 202011052282U1 is known to join a tool with a tool holder part by means of individual rivets. DE 202011052282U1, for example, describes an accessory for a multifunction oscillating tool which can be attached to an output shaft of a power tool. In the design shown in FIGS. 2 and 3, a mounting portion is joined to a working portion by means of rivets. Each of these rivets must be inserted individually, giving a considerable amount of work (paragraph [0024]).

DE 202007003364 discloses a tubular rivet, in which the shaft, upon insertion of the tubular rivet, is closed at its end on which a shop head is to be formed and on the opposite open end of the shaft an in radial direction, relative to the shaft, outwardly protruding collar is formed on the shaft as a factory head. A plurality of such rivets can be contiguous with their collar or can be interconnected. Appropriately, the interconnected collars in such a conception are provided by a rivet plate.

Such rivet plates serve for connecting tarp straps to the bottom area of a tarp of a trailer of a commercial vehicle. The use of tubular rivets is however limited, because they are less loadable than, for example, solid rivets.

SUMMARY

Embodiments of the invention provide connecting together nondetachably two materials, which cannot be welded, in an efficient manner. Various other embodiments provide a simplified attachment of a plurality of rivets for making a nondetachable joint of a tool with a tool holder part and thus to reduce the workload and the production costs.

The embodiments can be combined in a technologically useful manner. The description, in particular in combination with the drawings, additionally characterizes and specifies embodiments of the invention.

Accordingly, a component for producing a positive-locking rivet joint of a tool with a tool holder part, comprising a main body and a plurality of rivets, which are integrated into the main body, wherein by applying pressure to the rivets the positive-locking joint of the tool with the tool holder part is produced, is provided.

An embodiment of the invention is to create a device that combines a plurality of individual rivets. Thus, the handling of a plurality of individual rivets is eliminated and the placement of a riveting device made much easier. Another advantage of the component according to embodiments of the invention can be, that a cost effective way of producing a positive-locking rivet joint of a tool with a tool holder part is provided.

In an advantageous embodiment of the inventive component, the rivets are implemented as solid rivets. This is advantageous, since solid rivets can take very high loads compared to other types of rivets and are therefore more durable than, for example, tubular rivets.

In a further advantageous embodiment of the inventive component, the main body is formed as a common large-scale factory head, from which protrudes a plurality of rivet shafts. An advantage of the device according to the invention is the simplified handling, since only a single part has to be handled and not a plurality of rivets. The common factory head further facilitates the placement of a riveting device.

In a further advantageous embodiment of the inventive component the main body is formed annular. This embodiment of the inventive component is advantageous for the positive-locking joining, for example, of a disk-shaped saw blade or other disc-shaped tools to the tool holder part.

In a further advantageous embodiment of the inventive component the main body is formed rectangular or rod-shaped and the rivets are positioned in a zigzagged manner on the main body. This embodiment of the inventive component is advantageous for the positive-locking joining, for example, of a straight saw blade or other elongated tools to the tool holder part.

In a further advantageous embodiment of the component according to the invention the tool holder part is configured to cooperate with a tool holder of an electric oscillating power tool. For example, the power tool may be a multifunction tool for sawing, sanding, cutting, etc.

In a further advantageous embodiment of the inventive component, the tool holder part is formed cup-shaped. The cup-shaped design of the tool holder part enables working in hard to reach places.

Furthermore, in another embodiment of the invention is provided that the component of the invention is provided as a rivet ring with a plurality of recesses arranged on an inner wall of the rivet ring. Said recesses are preferably arranged rotationally symmetrical about the central axis of the rivet ring. For example, the recesses may take the form of grooves and are used to position the rivet ring with the other two parts in the correct position before the riveting operation. If the number of recesses corresponds to the number of rivets projecting from the rivet ring, the recesses may be offset in correspondence with the rivets such that the offset of each recess to the two adjacent rivets is the same and thus a will not be below a specified minimum distance between rivet and recess.

In a further advantageous embodiment, the tool comprises a saw blade, a grinding disk or a rasp. The component according to the invention is variable in design and can thus be used for a wide range of tools.

Further provided is a method for producing a positive-locking rivet joint of a tool with a tool holder part using a component, comprising the steps of: combining a plurality of rivets in the component; plugging together of the component, the tool and the tool holder part, such that the rivets protrude through aligned openings of the tool and of the tool holder part; inserting the assembled items in the mounting of a riveting device; and performing the riveting process for producing a positive-locking joint. By using the inventive component, the handling of a plurality of individual rivets is eliminated and the equipping of a riveting device is made much easier.

Furthermore, a method for production of the component is also provided in the form of a rivet ring, in which the component is produced by impact extrusion. In this case a punch presses the component blank for the rivet ring, which is preferably an aluminum alloy, into the shaping die.

BRIEF DESCRIPTION OF THE DRAWINGS

Below, several embodiments are described with reference to the drawings. Shown are.

DETAILED DESCRIPTION OF ILLUSTRATIVE EMBODIMENTS

Figure 1:
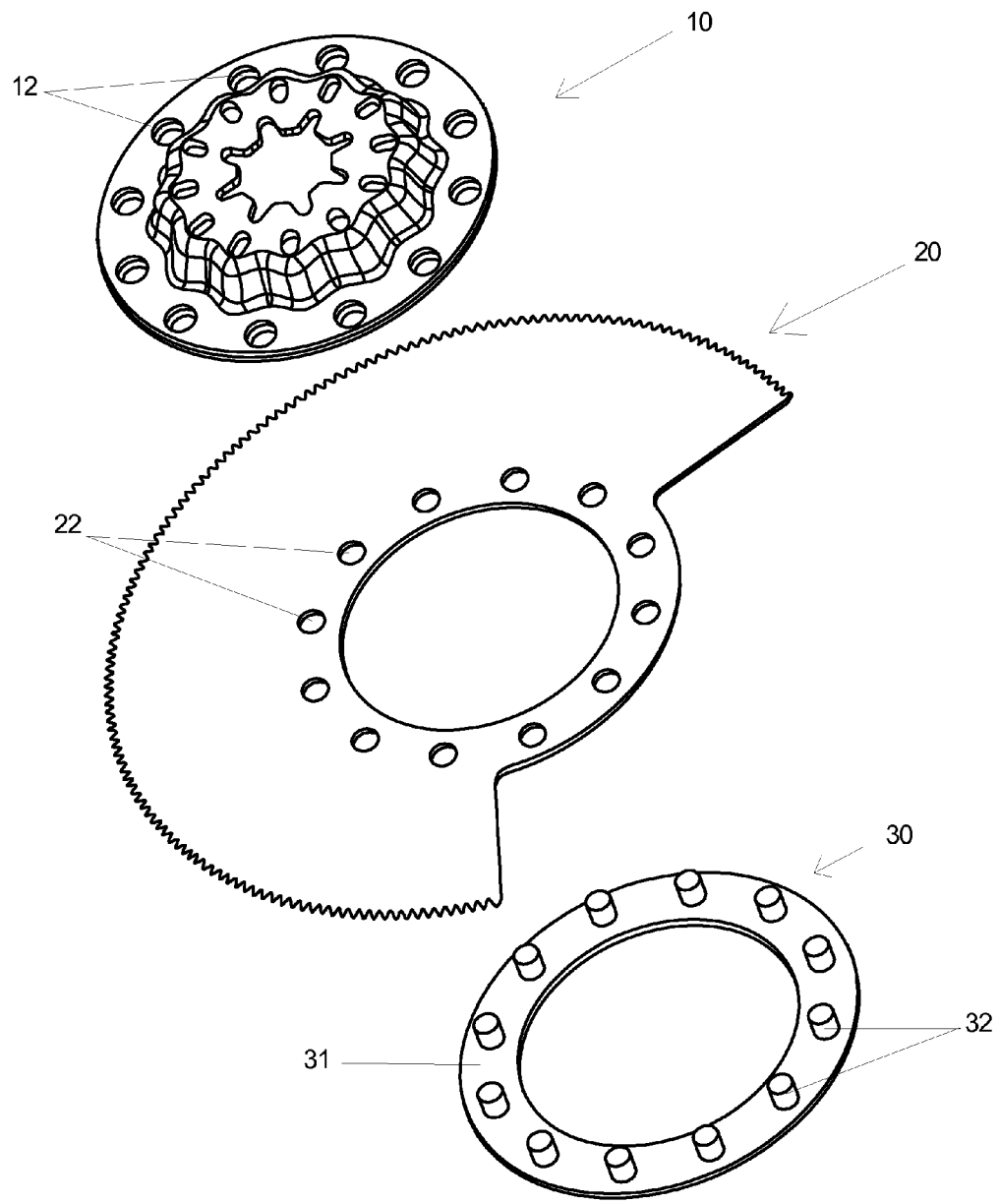
FIG. 1 is an exploded view of a tool holder part, a tool and a component of the invention for producing a positive-locking rivet joint.

In the figures, identical or functionally equivalent components are provided with identical reference numerals.

Figure 2:
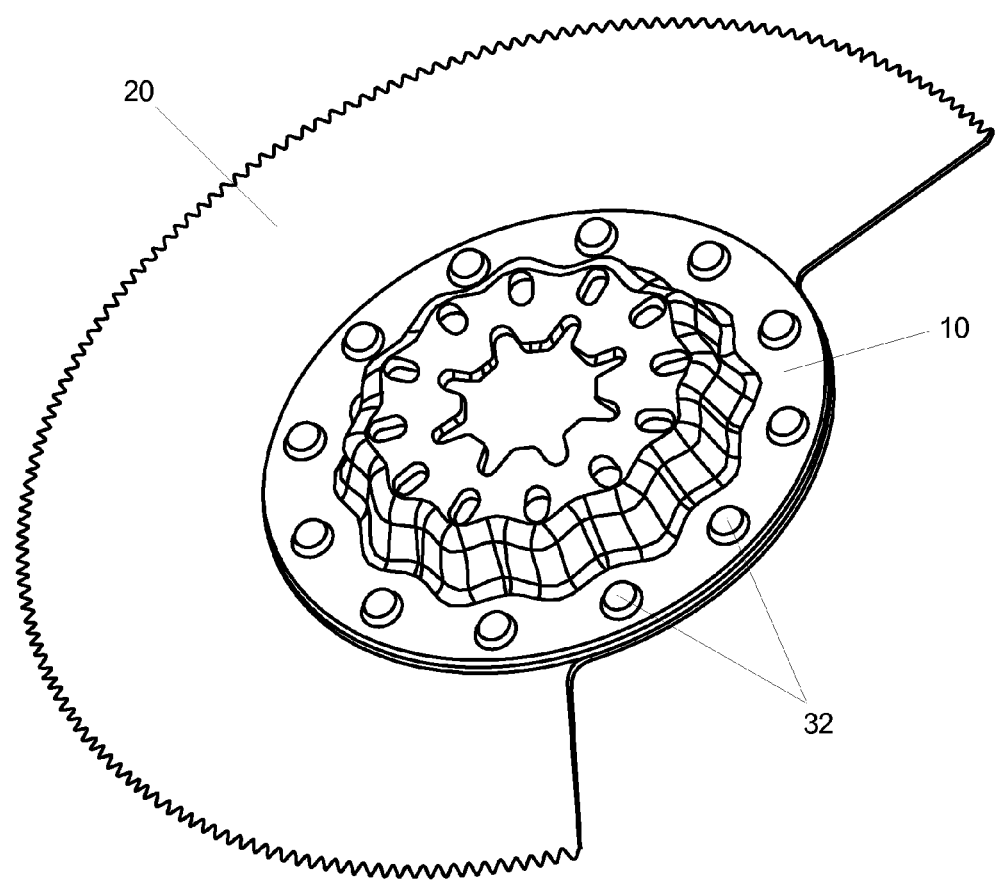
FIG. 2 is an isometric view of the tool with a riveted tool holder part.

FIG. 1 shows a tool holder part 10, which is configured to cooperate with a tool holder of an electric oscillating power tool (not shown), as well as a tool 20, which can be embodied as a saw blade, a grinding disk, a rasp or the like, for example. According to a possible embodiment, the tool is a disk-shaped saw blade segment, as shown in FIG. 1. The tool holder part 10 may, as shown in FIGS. 1 and 2, be formed with a cup and thus offset to allow or facilitate working in hard to reach places.

The tool holder part 10 and the tool 20 are known elements from the prior art. The tool 20 must be non-detachably connected to the tool holder part 10 so that it can be mounted in the electric oscillating power tool and driven thereby. The tool 20 and the tool holder part 10 may for certain applications be made of materials that are not weldable, such as, for example, spring steel, high speed steel or stainless steel.

For example, the electric oscillating power tool may be a conventional multi-tool for sawing, cutting and grinding, that cooperates with an extensive range of tools, shown here in the form of tool 20. The tool holder part 10 is preferably configured such that it allows for a relatively quick and easy exchange of the tool.

In FIG. 1 is further shown an inventive component 30 for producing a positive-locking rivet joint. The component 30 preferably has a main body 31, which combines a plurality of rivets 32 to a rivet group. The main body 31 may be embodied as a large-scale factory head, from which the rivet shafts 32 are protruding. The rivet shafts 32 preferably correspond to the rivet shafts of solid rivets, as these can absorb very high loads compared to other types of rivets. Alternatively, shafts of other types of rivets, for example, tubular rivets, may be integrated into the main body 31. The area and shape of the main body 31 as well as the number and arrangement of the rivet shafts 32 can be adjusted according to the particular application. Thus, the component 30 is flexibly usable.

In an exemplary embodiment, the main body 31 may have an annular shape as shown in FIGS. 1 and 2. Accordingly, the rivet shafts 32 may be arranged in a ring on the main body 31, so that a rivet ring is formed. Such a rivet ring may be used in the preparation of a positive-locking rivet joint of a disk-shaped tool 20, for example, a disk-shaped saw blade with a tool holder part 10.

According to another possible embodiment, the individual rivets can be combined to form a rod-shaped component 30. In this case the main body 31 is preferably rectangular or rod-shaped. Such a component 30 may be used in a straight tool 20, such as a straight saw blade. On the rectangular or bar-shaped component 30, the rivet shafts 32 may be arranged in a zigzagged manner, similar to known welding points on spot-welded saw blades known from the prior art. If necessary, a linear array of rivet shafts 32 on the rod-shaped component 30 is also possible.

Preferably, the component 30 can be entirely made of a rivet material, for example, steel, stainless steel, copper, brass, aluminum alloys, plastic or titanium, for example, by extrusion or similar mass production processes. This results in a cost-effective way of manufacturing the component 30.

As shown in FIG. 2, the component 30 can be used to produce a positive-locking rivet joint. Shown is a tool 20 with a riveted tool holder part 10. The component 30 itself is hidden in this representation by the tool 20. According to a possible embodiment, the tool 20 is a disk-shaped tool, illustrated here as a saw blade segment of a power tool. Accordingly, an annular component 30 having an annular main body 31 and annularly arranged rivet shafts 32 can be used for producing the positive-locking and thus non-detachable joint in this example. The parts to be joined, in the example shown the tool 20 and the tool holder part 10, have aligned openings 22 and 12, respectively. The rivet shafts 32 are positioned on the main body 31 with the openings 22 and 12 aligned (see FIG. 1).

In order to rivet the tool holder part 10 with the tool 20, the component 30, the tool 20 and the tool holder part 10 are inserted into each other, so that the rivet shafts 32 project through the openings 22 and 12. The inserted parts are placed in a riveting device. The subsequent riveting process is done as with individual rivets, wherein the rivets or rivet shafts 32 are deformed by pressure in the width so that on each rivet shaft 32 a shop head is formed, whereby the tool holder part 10 can be connected to the tool 20 in a positive-locking manner.

The mounting of the riveting apparatus is preferably configured such that only the tool holder part 10 and the component 30 are held, and the outer geometry of the tool 20 has no influence on the riveting apparatus. Thus, tools 20 of various sizes and shapes can be processed on a riveting apparatus without converting the riveting apparatus.

While the component 30 has been described for the production of a positive-locking riveted joint using the example of an electric power tool, the possible applications of the component 30 are not limited to this application, however.

Figure 3:
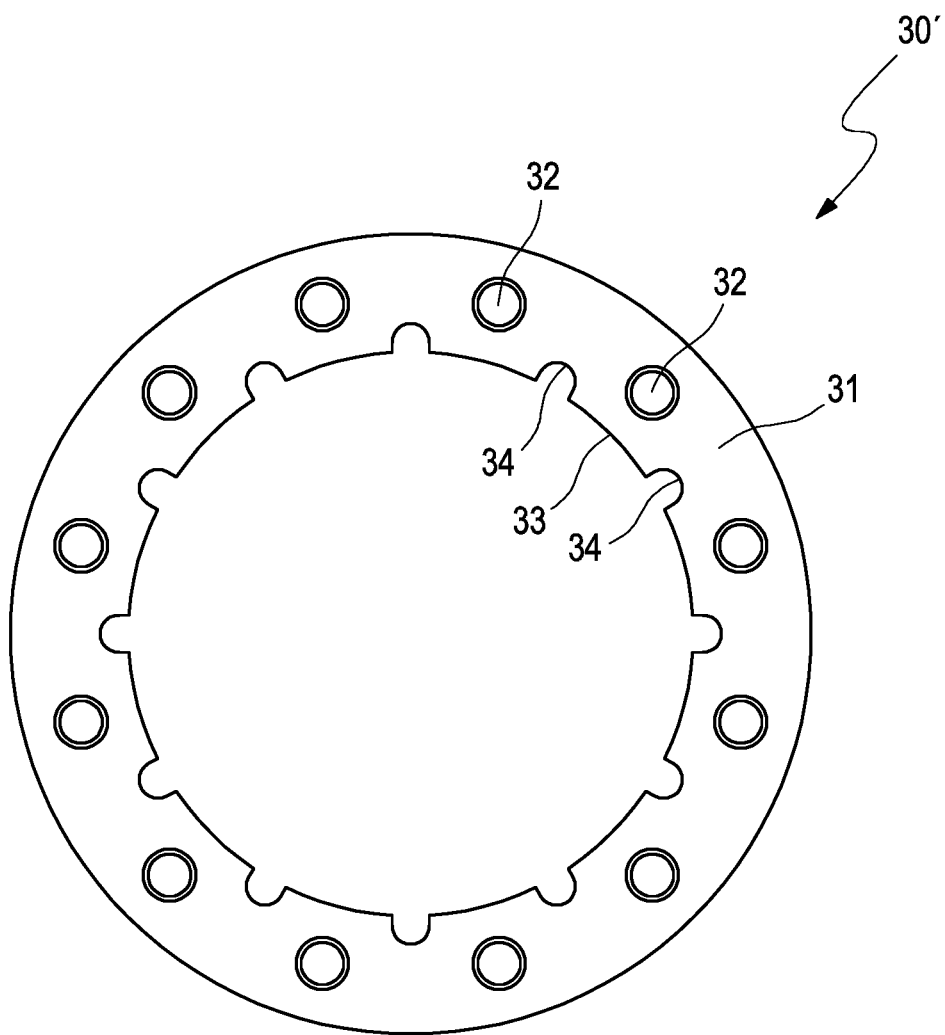
FIG. 3 is a plan view of another component for producing a positive-locking rivet joint.

FIG. 3 finally shows a further component 30' according to the invention that differs from the previously shown component 30 in particular by twelve recesses 34 arranged rotationally symmetrically on an inner wall 33 of the main body. Using the recesses 34, the component can be positioned in the correct position for connection to the tool 20 and the tool holder part 10, i.e. in particular achieve a predefined angular position between said parts.

Notwithstanding that in the preceding description several possible embodiments of the invention have been disclosed, it is understood, that numerous other variants of embodiments exist by possible combinations of all the technical features mentioned and also of all the technical features and embodiments obvious to the skilled person. It is further understood that the embodiments are to be understood merely as examples that do not limit the scope, applicability, and the configuration in any way. Rather, the preceding description would indicate to the skilled person an appropriate way in order to realize at least one exemplary embodiment. It is understood, that in an exemplary embodiment various changes in function and arrangement of elements may be made without departing from the scope and its equivalents disclosed in the claims.

LIST OF REFERENCE NUMERALS

10 tool holder part
12 opening
20 tool
22 opening
30, 30' component for producing a positive-locking rivet joint
31 main body
32 rivets/rivet shafts
33 wall
34 recess

The invention claimed is:

1. An electric power tool comprising:
   a tool;
   a tool holder part; and
   a main body comprising a plurality of rivets integrated with the main body, the rivets having a plurality of rivet shafts of circular cross section for producing a positive-locking rivet joint of the tool with the tool holder part, wherein the tool and the tool holder part have circular openings which are aligned with each other, and wherein the rivet shafts are aligned with the openings on the main body and protrude through the aligned openings.

2. The electric power tool according to claim 1, wherein the main body is formed as a common large-scale factory head from which the rivet shafts protrudes.

3. The electric power tool according claim 1, wherein the main body is annular.

4. The electric power tool according to claim 1, wherein the main body is rectangular or rod-shaped.

5. The electric power tool according to claim 4, wherein the rivets are arranged in a zigzagged manner on the main body.

6. The electric power tool according to claim 1, wherein the tool holder part is configured to interact with a tool holder of an electric oscillating power tool.

7. The electric power tool according to claim 1, wherein the tool holder part is cup-shaped.

8. The electric power tool according to claim 1, wherein the tool comprises a saw blade, a grinding plate or a rasp.

9. A method for producing a positive-locking rivet joint of a tool with the tool holder part using the main body for the electric power tool according to claim 1, the method comprising:
   plugging together the main body, the tool and the tool holder part such that the rivets protrude through openings of the tool and the tool holder part, the openings being aligned in a plugging direction;
   inserting the assembled main body, tool and tool holder part in a mounting of a riveting device; and
   performing a riveting process for producing the positive-locking rivet joint.

* * * * *